No. 649,539. Patented May 15, 1900.
J. B. ENGSTROM.
FARM GATE.
(Application filed Oct. 14, 1899.)
(No Model.)
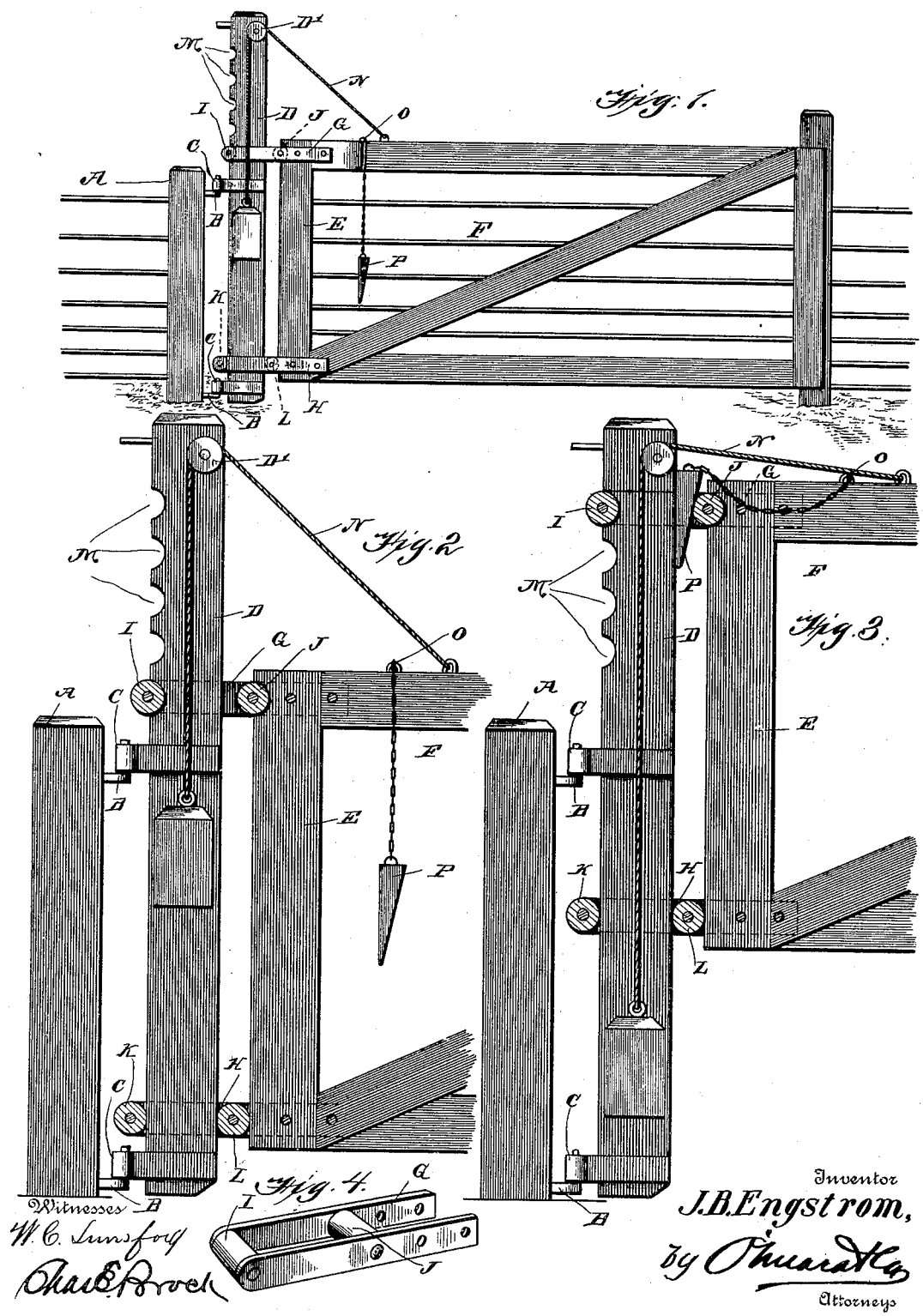
Inventor
J. B. Engstrom,

UNITED STATES PATENT OFFICE.

JACOB B. ENGSTROM, OF MANCHESTER, IOWA.

FARM-GATE.

SPECIFICATION forming part of Letters Patent No. 649,539, dated May 15, 1900.

Application filed October 14, 1899. Serial No. 733,642. (No model.)

*To all whom it may concern:*

Be it known that I, JACOB B. ENGSTROM, a citizen of the United States, residing at Manchester, in the county of Delaware and State of Iowa, have invented a certain new and useful Farm-Gate, of which the following is a specification.

My invention relates to that class of farm-gates which swing upon hinges or pivots at one side, and has for its object to provide gates of this class with improved means whereby they may be quickly and easily raised off the ground and retained in elevated position without interfering with their swinging.

To this end my invention consists in the improved construction, arrangement, and combination of parts hereinafter fully described and afterward specifically pointed out in the claims.

In order to enable others skilled in the art to which my invention most nearly appertains to make and use the same, I will now proceed to describe its construction and operation, reference being had to the accompanying drawings, forming part hereof, in which—

Figure 1 is a side elevation illustrating a gate constructed in accordance with my invention. Fig. 2 is a view in elevation, on an enlarged scale, of the post and supporting-bar and part of the gate in normal position. Fig. 3 is a similar view, the gate being shown in elevated position. Fig. 4 is a detail perspective view of one of the gate-hangers detached.

Like letters of reference mark the same parts wherever they occur throughout the various figures of the drawings.

Referring to the drawings by letters, A indicates the gate-post, upon which the gate is swung, the pintle portions B of the hinges being driven into the post and eye portions C of the hinges secured upon an upright post D, somewhat longer than the batten E of the gate F.

Hangers G and H, consisting of metal strips with rollers I and J and K and L journaled between them, are secured to the gate and straddle the post D, the rollers I and K being on the edge of the post B next to the gatepost A and the rollers J and L on the side next to the gate.

The post D is provided in the upper portion of its rear edge with a series of semicircular notches M of a size to correspond with the rollers.

The rollers in the hanger H are spaced apart a distance greater than the width of the post around which the hanger is secured to allow sufficient play to permit the free end of the gate to be lifted, as will be hereinafter referred to. The rollers in the hanger G are spaced farther apart than those in the hanger H, whereby the roller I may be disengaged from the notches M when it is desired to raise the gate.

In operation when the gate is raised the roller I of hanger G, whose normal position is in the lowest notch of the series, will be carried backward out of said notch, the gate tilting on the roller K slightly until as it clears the notch the roller J comes in contact with the front edge of post D. The further upward pressure upon the gate will cause it to rise on the post, rolling on rollers J and K, bearing upon opposite sides of post D. When the desired height is reached, the gate is released, when its weight will cause its forward end to bear downward, and as soon as a notch is reached the roller I will slip into it. The weight of the gate will securely hold the roller I in the notch and prevent any further descent of the gate.

On the upper end of the upright post D is a pulley D', over which is arranged a cord or rope N, secured to the upper rail of the gate F by an eye and to the free end of which is suspended a weight sufficiently heavy to compensate in a measure for the weight of the gate and whereby the raising and lowering of the gate can be accomplished readily without an extra amount of exertion by the person attempting to perform this task.

Suspended from the gate at a suitable point by a flexible connection O is a wedge P, adapted to be forced or dropped between the metal strips of the hanger G in rear of the end batten of the gate, whereby the roller I will be securely locked in engagement with one of the semicircular notches M on the upright post D.

The advantages attending the use of my improved gate are obvious. By means of the construction described the gate may be readily raised by simply applying force to any single portion, and the gate when raised to a suitable height to swing clear of snow-drifts or other obstructions or to separate small from large stock will be held by the weight of the gate itself, at the same time being capable of being instantly lowered when desired.

Having thus fully described my invention, what I claim as new, and desire to secure by Letters Patent, is—

1. The combination with a gate-post, of a post hinged thereto and a gate attached to the hinged post by hangers straddling said post, whereby the gate is vertically adjustable thereon, and a wedge inserted between the front edge of the post and one of the hangers to bind the hangers against said post, substantially as described.

2. In combination with a gate provided on its hinge end with hangers each of which consists of two strips of metal, one secured to the outside and the other to the inside of the gate and projecting beyond it and parallel with each other, two rollers journaled in the projecting portions, the rollers of the top hanger being wider apart than the others, a notched post engaged by the hangers a weighted flexible connection connected to the gate and supported by the post, and a wedge removably secured between the top hanger and post, substantially as described.

JACOB B. ENGSTROM.

Witnesses:
A. H. McGREW,
FRED B. BLAIR.